(12) United States Patent
Malyugin et al.

(10) Patent No.: US 9,436,471 B2
(45) Date of Patent: *Sep. 6, 2016

(54) EFFICIENT RECORDING AND REPLAYING OF NON-DETERMINISTIC INSTRUCTIONS IN A VIRTUAL MACHINE AND CPU THEREFOR

(71) Applicant: VMware, Inc., Palo Alto, CA (US)

(72) Inventors: Vyacheslav V. Malyugin, Los Gatos, CA (US); Min Xu, Palo Alto, CA (US); Boris Weissman, Palo Alto, CA (US); Ganesh Venkitachalam, Mountain View, CA (US); Alexander Klaiber, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 13/926,605

(22) Filed: Jun. 25, 2013

(65) Prior Publication Data

US 2013/0290689 A1 Oct. 31, 2013

Related U.S. Application Data

(63) Continuation of application No. 12/167,782, filed on Jul. 3, 2008, now Pat. No. 8,473,946.

(51) Int. Cl.
*G06F 9/46* (2006.01)
*G06F 9/455* (2006.01)
*G06F 9/30* (2006.01)
*G06F 11/34* (2006.01)

(52) U.S. Cl.
CPC ......... *G06F 9/3005* (2013.01); *G06F 11/3414* (2013.01); *G06F 11/3476* (2013.01)

(58) Field of Classification Search
None
See application file for complete search history.

(56) References Cited

U.S. PATENT DOCUMENTS

| 7,155,570 | B1 * | 12/2006 | Singh | G06F 9/3802 710/52 |
|---|---|---|---|---|
| 7,363,536 | B1 | 4/2008 | Gardner et al. | |
| 2004/0230712 | A1 | 11/2004 | Belmar et al. | |
| 2006/0167950 | A1 | 7/2006 | Vertes | |
| 2006/0294341 | A1 * | 12/2006 | Plondke | G06F 9/4812 711/207 |
| 2007/0198676 | A1 | 8/2007 | Vertes | |

OTHER PUBLICATIONS

European Search Report for Application No. 13186951.3, dated Oct. 6, 2014, 7 pages.
Choi et al., "A Perturbation-Free Replay Platform for Cross-Optimized Multithreaded Applications" Parallel and Distributed Processing 15th Inter National San Francisco, CA Apr. 23-27, 2001, Los Alamitos, CA, IEEE Computer Soc. Apr. 23, 2001, p. 10pp XP010544385, ISBN: 978-0-7695-0990-7, *whole document*.

* cited by examiner

*Primary Examiner* — Mengyao Zhe

(57) ABSTRACT

The output of a non-deterministic instruction is handled during record and replay in a virtual machine. An output of a non-deterministic instruction is stored to a buffer during record mode and retrieved from a buffer during replay mode without exiting to the hypervisor. At least part of the contents of the buffer can be stored to a log when the buffer is full during record mode, and the buffer can be replenished from a log when the buffer is empty during replay mode.

9 Claims, 5 Drawing Sheets

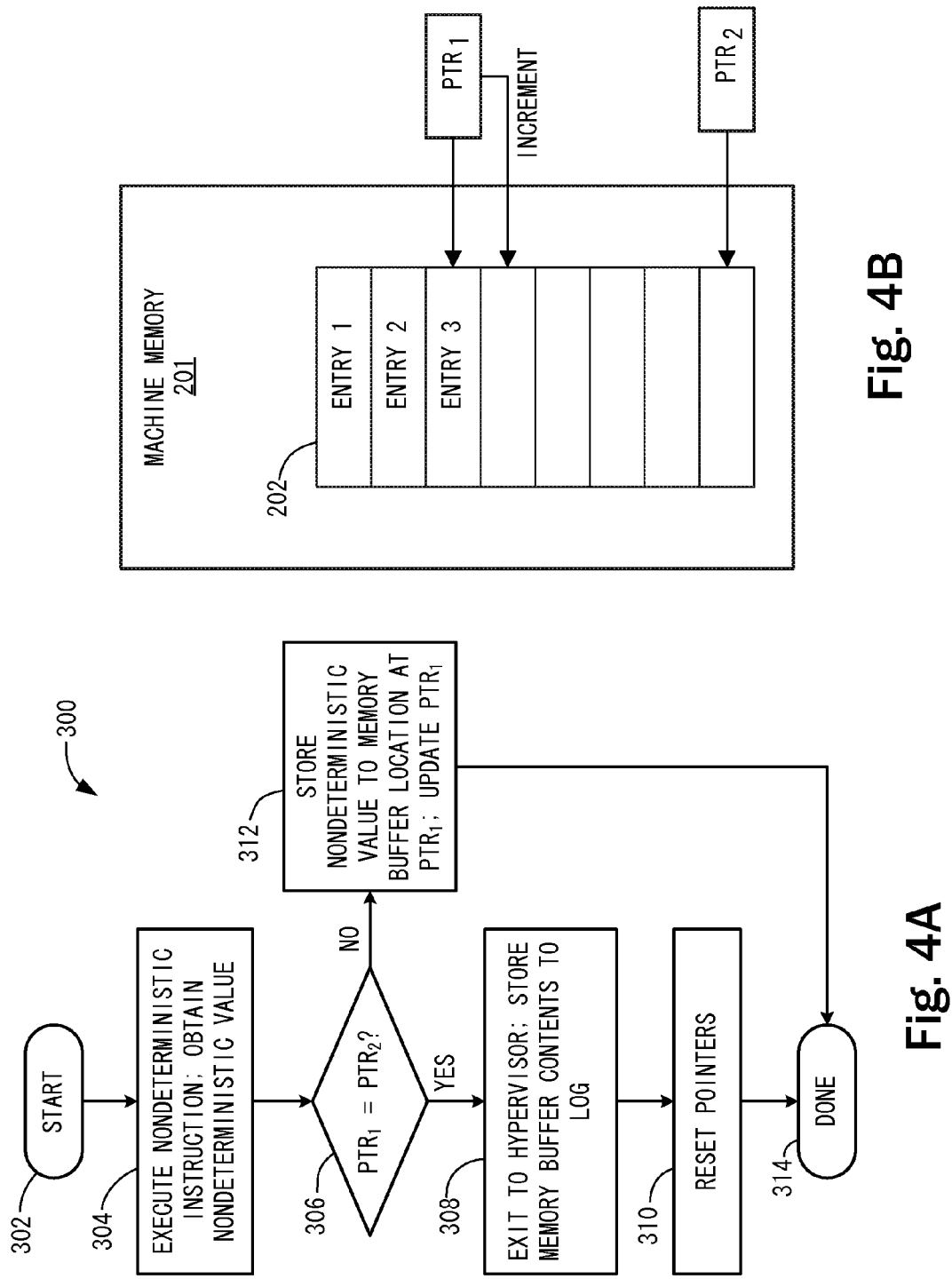

EFFICIENT RECORDING AND REPLAYING OF NON-DETERMINISTIC INSTRUCTIONS IN A VIRTUAL MACHINE AND CPU THEREFOR

CROSS-REFERENCE TO RELATED APPLICATION(S)

This application is a Continuation of U.S. patent application Ser. No. 12/167,782, filed Jul. 3, 2008, which has issued as U.S. Pat. No. 8,473,946.

BACKGROUND

Deterministic replay in a virtual machine creates an execution that is logically equivalent to an original execution of interest. Two executions are logically equivalent if they contain the same set of dynamic instructions, each dynamic instruction computes the same result in the two executions, and the two executions compute the same final state of the system (processor, memory and devices). Virtual machines are software abstractions of physical computer systems, generally using virtualization software which is typically a thin layer of software that logically sits and provides an interface between hardware and guest OS. Virtualization is well known to those in the field of computer science.

A virtual machine-based deterministic replayer may support full-system replay; i.e., the entire virtual machine (VM), including guest operating system (OS) and guest applications, is recorded and replayed. During recording, all sources of non-determinism from outside the virtual machine are captured and logged in a log file. These include data and timing of inputs to all devices, including virtual disks, virtual network interface cards (NIC), etc. A combination of techniques, such as device emulation and binary translation, are used to ensure deterministic replay as long as the recorded device input data are replayed at right time.

Certain central processor unit (CPU) instructions are non-deterministic. A non-deterministic instruction is one whose output is not determined entirely by its inputs or a current architectural state. For example, the x86 RDTSC instruction returns the current time expressed in processor clocks, RDPMC and RDMSR return the contents of performance counter registers, etc. As shown in FIG. 1, the outputs of non-deterministic instructions can arise from the interaction of the VM with a non-deterministic units such as real time clock 16, which is a device that can be queried by a CPU with a RDTSC instruction, whose result is returned in real-time and depends on the when the instruction is executed. Examples of other non-deterministic units include input devices (such as a keyboard, mouse, microphone, etc.) a thermal sensor, a transducer, a network card, a video camera, and so on. Such devices are non-deterministic because they produce inputs that cannot be predicted based solely on the state of the machine.

When executing an application within certain VMs, the virtualization software can record the complete execution behavior. Having saved this behavioral information, the user can replay that exact and complete behavior an unlimited number of times. This can be useful for debugging. For example, a users can record execution of the VM, and then attach a gdb debugger to the guest operating system or guest applications during replay. On replay, the user can look at memory, set breakpoints, and single step through the execution to identify problems and resolve them. Of course, record and replay have other applications, any of which may benefit from the embodiments described herein.

FIG. 1 shows one example of a virtualized computer system 10 wherein the results of non-deterministic instructions are stored in log 40 during record mode. One of applications 28 or guest operating system 24 (including drivers 26) may issue a non-deterministic instruction to virtual system hardware 22, which, as generally known, is implemented by virtualization software 30, e.g., by hypervisor 32. Guest instructions (that is, instructions issuing from VM 20) are often directly executed on host CPU 14. During direct execution of guest instructions from VM 20, the virtual memory system (not shown) and CPU 14 of host platform 12 assume a configuration associated with the context of VM 20. In the present example, VM 20 issues a non-deterministic instruction to read a timestamp value from real-time clock 16, which returns the non-deterministic value, i.e., the timestamp value. Other instructions may similarly elicit non-deterministic values as described above. When system 10 is in record mode, hypervisor 32 records the value in log 40 so that the same results may be made available during replay so that the replay behavior duplicates the behavior of the VM 20 during record mode. In order for the hypervisor to carry out the function of recording the non-deterministic value to log 40, system 10 must exit the context associated with VM 20 and enter a context associated with hypervisor 32. Similarly, when a non-deterministic instruction is executed during replay, it triggers an exit from the context of VM 20 to a context of hypervisor 32, which reads the non-deterministic value from log 40 and returns the value that was recorded for the instruction to VM 20.

Changing execution contexts from VM 20 to hypervisor 32 and back is a resource-intensive operation that can introduce substantial penalties in performance. This problem can become severe when numerous such exits are required due to the execution of many non-deterministic instructions from guest application 28 during record and replay. For example, one or more non-deterministic instructions can occur in a loop, causing a large number of non-deterministic instruction executions in a short time.

SUMMARY OF THE INVENTION

The result of a non-deterministic instruction is handled during record and replay in a virtual machine. A result of a non-deterministic instruction is stored to a storage buffer during record mode and retrieved from a storage buffer during replay mode without exiting to the hypervisor. At least part of the contents of the storage buffer can be stored to a log when the storage buffer is full during record mode, and the storage buffer can be replenished from a log when the storage buffer is empty during replay mode. Embodiments of the invention can be partially implemented in hardware by altering the semantics for the execution of non-deterministic instructions based on a record/replay operating state or mode of operation. Embodiments of the invention can also be implemented completely in software.

BRIEF DESCRIPTION OF THE DRAWINGS

FIG. 4A is a flow chart illustrating a method in accordance with an embodiment of the present invention in record mode.

FIG. 4B illustrates the operation of a memory buffer in accordance with an embodiment of the present invention during record mode.

DETAILED DESCRIPTION

Figure 1:
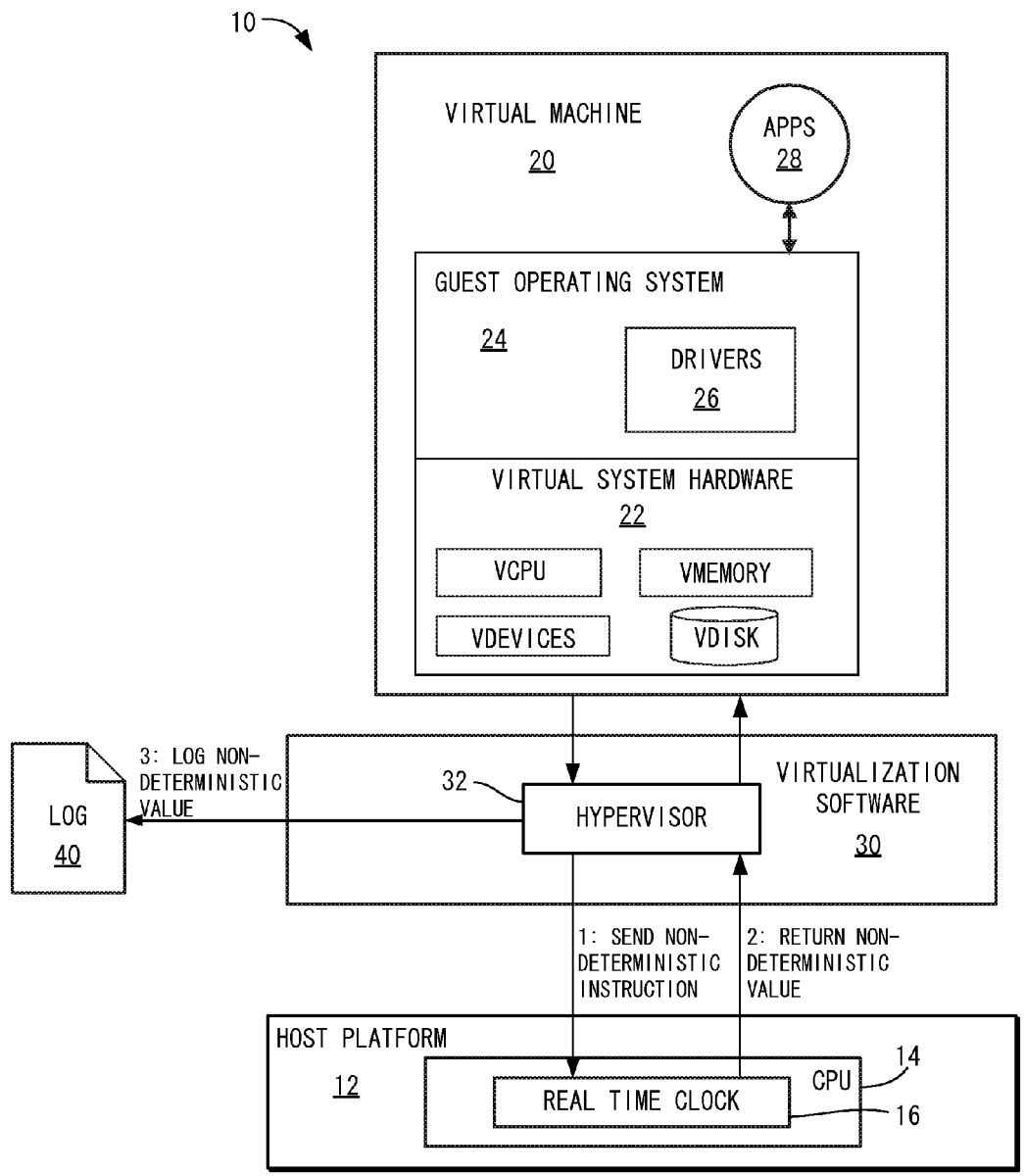
FIG. 1 shows one example of a virtualized computer system wherein the results of non-deterministic instructions are stored in a log during record mode.

In an exemplary hardware-assisted replaying virtualization system, during record mode, the result of a non-deterministic instruction is stored in hardware registers or machine memory by the physical hardware, generally without exiting to the virtualization software. Likewise, during replay mode, results of non-deterministic instructions are retrieved from hardware registers or machine memory by the physical hardware, again generally without exiting to the virtualization software. The storage and retrieval of non-deterministic instruction results without exiting to the virtualization software can make more effective use of processor cycles.

In describing the present invention, it is useful to identify three particular states of operation for a virtualization system implementing the present invention. First, a currently executing virtual machine (VM) may be in record mode; second, a currently executing VM may be in replay mode; and, third, there may be no currently active VM in either record mode or replay mode. If there are multiple CPUs in a virtualization system, each CPU may be in one of these three operating states independently of the other CPUs in the system, depending on whether a VM is currently executing on the respective CPU and, if there is a VM executing on the CPU, depending on the execution mode of that VM. Each CPU may be a processor or a processor core in a multicore processor. Thus, these three operating states may be referred to as record/replay operating states, or CPU-specific record/replay operating states. Also, a given CPU may be said to have a record/replay operating state of "record" when a VM that is executing on the CPU is in record mode; the CPU may be said to have a record/replay operating state of "replay" when a VM that is executing on the CPU is in replay mode; and the CPU may be said to have a record/replay operating state of "normal" when there is no VM executing on the CPU that is in either record mode or replay mode.

In some embodiments of this invention, the semantics for the execution of non-deterministic instructions are altered, based on which of these three operating states applies for a given CPU. Some suitable means may be provided to indicate a current record/replay operating state to a CPU, or, more specifically, to indicate when an active VM is executing in record mode on the CPU, when an active VM is executing in replay mode on the CPU, and when there is no active VM executing on the CPU in either record mode or replay mode. For example, the record/replay operating state may be indicated using one or more bits in a machine specific register (MSR), or in any other data structure. For example, one bit may be set to indicate the record operating state, a second bit may be set to indicate the replay operating state, and both bits may be cleared to indicate the normal operating state. In some embodiments, a CPU determines its current record/replay operating state each time it encounters a non-deterministic instruction, such as by reading selected bits that indicate the state, for example. In other possible embodiments, a CPU may have distinct record/replay modes of operation, such that the CPU need not determine its operating state each time it encounters a non-deterministic instruction. For example, the CPU may have a normal mode, a record mode and a replay mode. When the CPU is set to normal mode, it will execute non-deterministic instructions according to "normal semantics," until it is switched to a different record/replay mode of operation; when the CPU is set to record mode, it will execute non-deterministic instructions according to "record semantics," until it is switched to a different record/replay mode of operation; and, when the CPU is set to replay mode, it will execute non-deterministic instructions according to "replay semantics," until it is switched to a different record/replay mode of operation. The semantics for execution of deterministic instructions generally are not affected by the record/replay operating state or mode of operation.

Figure 2:
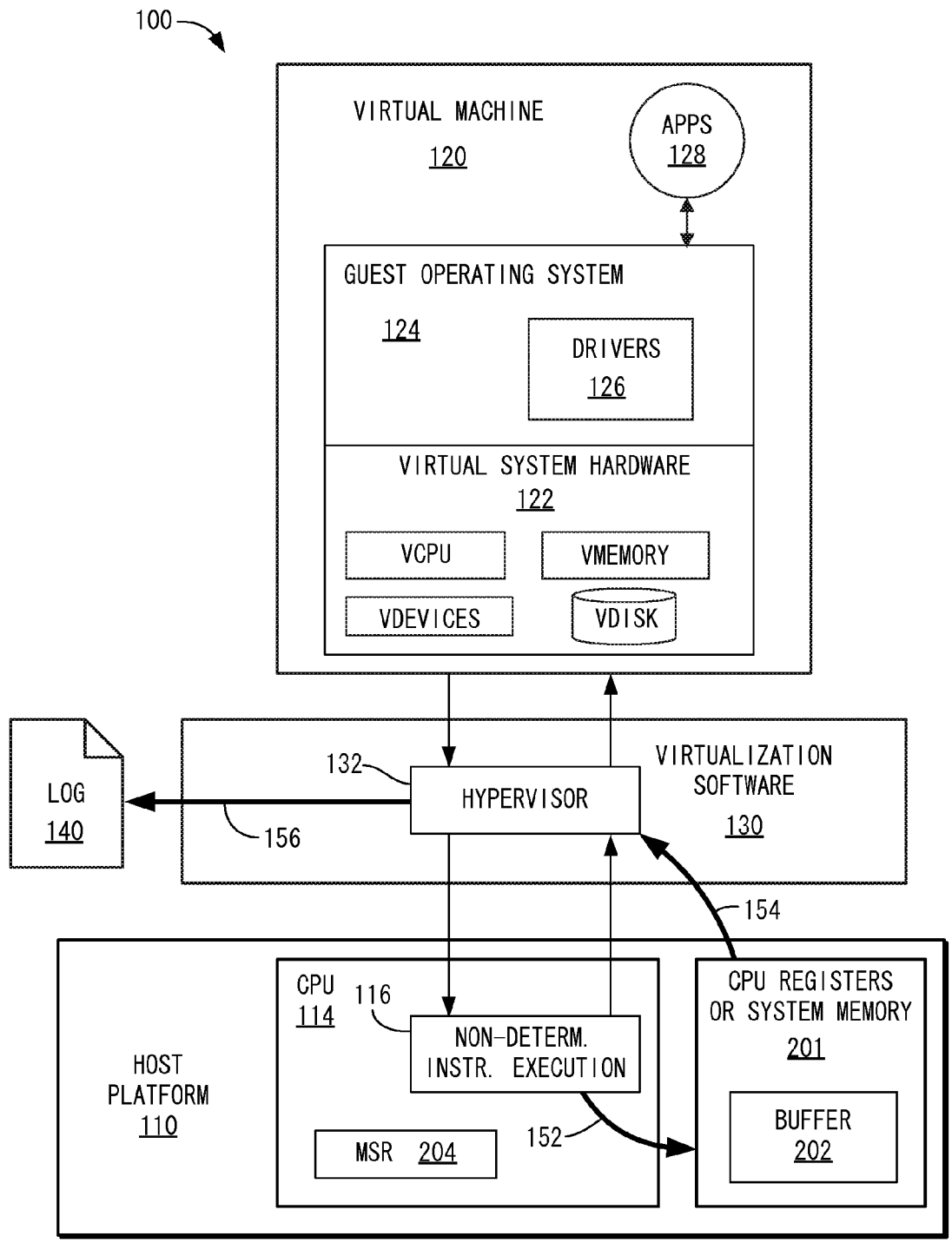
FIG. 2 shows a system and method for implementing a record mode in accordance with an embodiment of the present invention.

FIG. 2 illustrates a virtualization system 100 having an active virtual machine (VM) 120 executing in record mode. Virtualization system 100 executes on a host platform 110, which includes one or more CPU(s) 114. Virtualization system 100 also includes virtualization software 130, which supports execution of VM 120. VM 120 includes virtual system hardware 122, a guest operating system 124, including drivers 126, and guest applications 128. Virtualization software 130 may have any of a wide variety of configurations and implementations. FIG. 2 shows virtualization software 130 as including hypervisor 132, as just one example.

In one embodiment, when VM 120 is executing in record mode on CPU 114, such that virtualization system 100 is in a record/replay operating state of "record", CPU 114 is controlled to implement record semantics for the execution of non-deterministic instructions. For example, hypervisor 132 may set one or more bits in machine specific register (MSR) 204, or in any other data structure, etc., to indicate that an active VM is executing in record mode. When a non-deterministic instruction is executed 116 while a VM is in record mode, CPU 114 will generally store the returned value to buffer 202 in system memory or CPU hardware registers or system memory 201 as indicated by arrow 152, rather than immediately exiting to the hypervisor context. For example, buffer 202 may be at a location in system memory identified by a physical address supplied by hypervisor 132, e.g., by storing the address in MSR 204, when setting the CPU to "record" mode.

As used herein, the term "buffer" refers to a data structure in which entries are located in memory, in at least one hardware register, or in a combination thereof. In one embodiment, buffer 202 resides in machine memory that is not available to guest operating systems 124 and applications 128, but is available to the hypervisor 132. When memory buffer 202 is full, CPU 114 can trigger an exit to the hypervisor context so that hypervisor 132 may store at least some of the contents of memory buffer 202 to log 140, which may reside, e.g., in a mass data storage device that is within or accessible to host platform 110. Memory buffer 202 may be managed by pointers. For example, when memory 201 for the memory buffer 202 is allocated, a first pointer $PTR_1$ can be established that points to the next available memory location. $PTR_1$ may be initialized to the beginning of the memory buffer 202. A second pointer $PTR_2$ can be established that points to the end of the memory buffer 202. While PTR$_1$ is less than or equal to PTR$_2$, a value can be stored at the address pointed-to by PTR$_1$ and PTR$_1$ can be incremented. When the memory buffer 202 is full, PTR$_1$>PTR$_2$, which can trigger an exit to the hypervisor 132 so that the memory buffer 202 contents may be copied by hypervisor 132 to log 140 and the memory buffer 201 cleared, as indicated by arrows 154, 156. The hypervisor 132 may be responsible for once again initializing PTR$_1$ to point to the first available memory location in the memory buffer, while PTR$_2$ may point to the end.

The order in which the various operations take place when flushing buffers 202 may be varied. For example, the system may exit to the hypervisor context when, after executing a nondeterministic instruction and realizing that the buffer is full, in which case the new nondeterministic may be value held until the context returns to the guest VM so that the new value may be entered into the now empty buffer. Alternatively, the system may pass the new value to the hypervisor after determining the buffer is full. In this case, the hypervisor may copy the contents of the full buffer plus the new value to log 140, the new value being handed-off to the hypervisor during the context switch. It is also possible to ignore the result of the non-deterministic instruction when the buffer is full, drop to the hypervisor context, and then re-execute the non-deterministic instruction upon returning to the VM context, storing the result to the now-emptied buffer. In yet another embodiment, the system may check whether the buffer is full after each write to the buffer. When the buffer is full, it may then switch to hypervisor context so that the hypervisor can copy the contents to log file 140 and start with a new execution when returning to the guest VM context.

Figure 3:
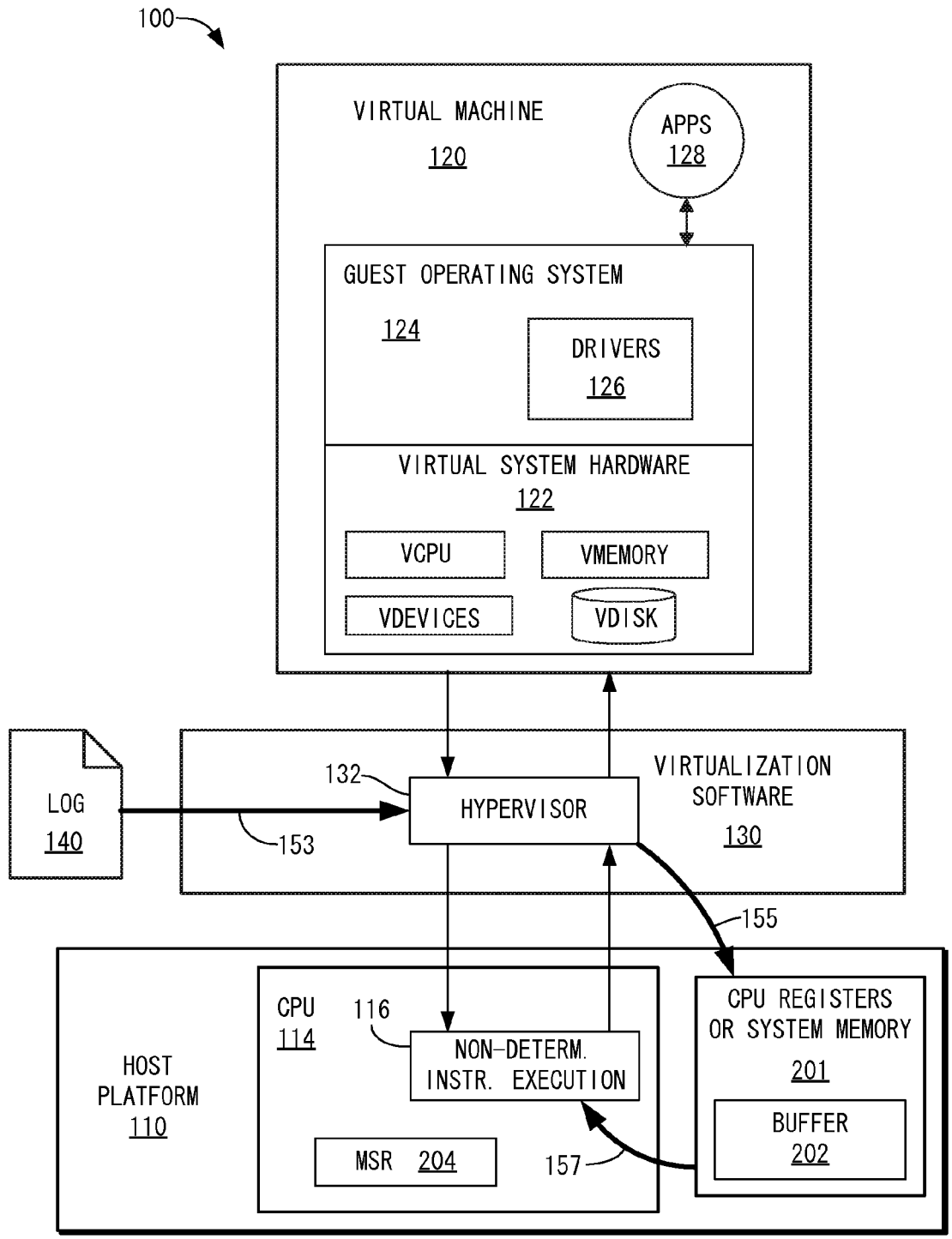
FIG. 3 shows a system and method for implementing a replay mode in accordance with an embodiment of the present invention.

An embodiment during replay mode is shown in FIG. 3. In this mode, according to one embodiment, the hypervisor 132 allocates memory 201 for the memory buffer 202 and populates memory buffer 202 with entries from log 140 created during a previous recording session, as indicated by arrows 153, 155. Hypervisor 132 may establish pointers PTR$_1$ and PTR$_2$, where PTR$_1$ points to the next value in the memory buffer and PTR$_2$ points to the end of the memory buffer 202. Operation of the pointers is described in more detail below with reference to FIG. 5B. Hypervisor 132 places CPU in replay mode in a manner such as previously described above with reference to placing the CPU in record mode. When a non-deterministic instruction is received in replay mode, the CPU returns the stored value, as indicated by arrow 157, instead of executing the instruction normally and PTR$_1$ can be incremented by the CPU. Alternatively, the instruction may be executed normally, but with the results being replaced or ignored in favor of the non-deterministic value read from buffer 202.

The normal execution of a non-deterministic instruction may correspond to the way in which it is executed when the virtual machine 120 is in neither record nor replay mode, i.e., without having to change out of the VM execution context. For example, if, during replay, the non-deterministic instruction is RDTSC, then CPU 114 returns the corresponding value previously recorded in memory buffer 202, rather than the actual current time at that point. When at least part of the memory buffer 202 is empty, CPU can invoke the hypervisor 130 to replenish the memory buffer 202 with additional non-deterministic values that were stored to the log 140 during record mode. Those values can subsequently be returned upon the execution of further non-deterministic instructions during replay. An empty memory buffer 202 can be detected when PTR$_1$ is equal to PTR$_2$, at which point the system may drop to hypervisor 130 in order to refill the memory buffer 202 from entries in log 140 and reset PTR$_1$ to point to the next non-deterministic value in replay mode. PTR$_2$ can be set to point to the end of the memory buffer 202. In embodiments of the present invention, the memory buffer 202 can be replenished before it is empty.

The order in which the various operations take place when refreshing buffer 202 may be varied. In one embodiment, when a non-deterministic instruction is received, the CPU may check the buffer pointers PTR$_1$, PTR$_2$ to identify the location of the next previously recorded non-deterministic value. If the PTR$_1$ equals PTR$_2$, then the system changes context to the hypervisor as described above so that the buffer may be loaded with new non-deterministic values. Upon returning to the VM context, the original non-deterministic instruction may be restarted, in which case the first element of the buffer will be read. In another embodiment, the buffer may be eagerly refilled after the CPU reads the last element from the buffer, so that, upon receiving the next non-deterministic instruction, the next value will be readily available. Those skilled in the art will recognize that there are many possible implementations for refilling the buffer during replay, as well as copying the buffer to the log during record, so that the frequency of hypervisor invocations is reduced. The examples presented herein should therefore be understood as illustrative, and not limiting in any way.

FIGS. 4A and 4B show by way of example how pointers and non-deterministic values may be handled during record mode. FIG. 4A shows a flowchart 300 illustrating by way of example a method CPU 114 may perform when recording a non-deterministic guest instruction. Prior to execution, memory buffer 202 (FIG. 4B) is allocated in machine memory 201, pointer PTR$_1$ is established for pointing to a next available position in memory buffer 202, and pointer PTR$_2$ is established for pointing to the end of memory buffer 202.

The procedure begins as indicated by start block 302 and flows to operation 304 wherein a non-deterministic instruction is executed. Non-deterministic instructions may be a predefined subset of instructions that CPU 114 can execute. Once the non-deterministic value is obtained as a result of the execution in operation 304, the procedure flows to operation 306 to determine if PTR$_1$ is equal to PTR$_2$. When PTR$_1$ is not equal PTR$_2$, the procedure flows to operation 312, wherein the non-deterministic value is stored at the location identified by PTR$_1$, i.e., entry 3 as shown in FIG. 4B. PTR$_1$ is then updated, e.g., incremented, to the next available memory buffer 202 location as shown in FIG. 4B. When PTR$_1$ is equal PTR$_2$ in operation 306, then the procedure flows to operation 308, wherein the system exits the VM context and enters the hypervisor context so that the hypervisor can copy the contents of memory buffer 202 to log 140 (FIGS. 2, 3). As mentioned above, in one embodiment, the new non-deterministic value may be presented to the hypervisor during the switch so that it is recorded to log 140 along with the contents of buffer 202. Then in operation 301, pointers PTR$_1$ and PTR$_2$ may be reset. The procedure then ends as indicated by done block 314.

Figure 5B:
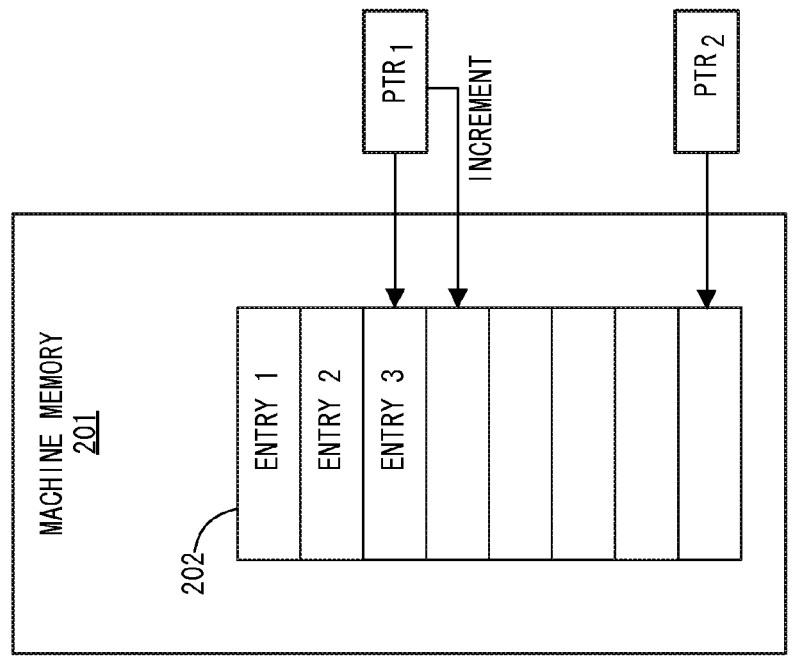
FIG. 5B illustrates the operation of a memory buffer in accordance with an embodiment of the present invention during replay mode.
Figure 5A:
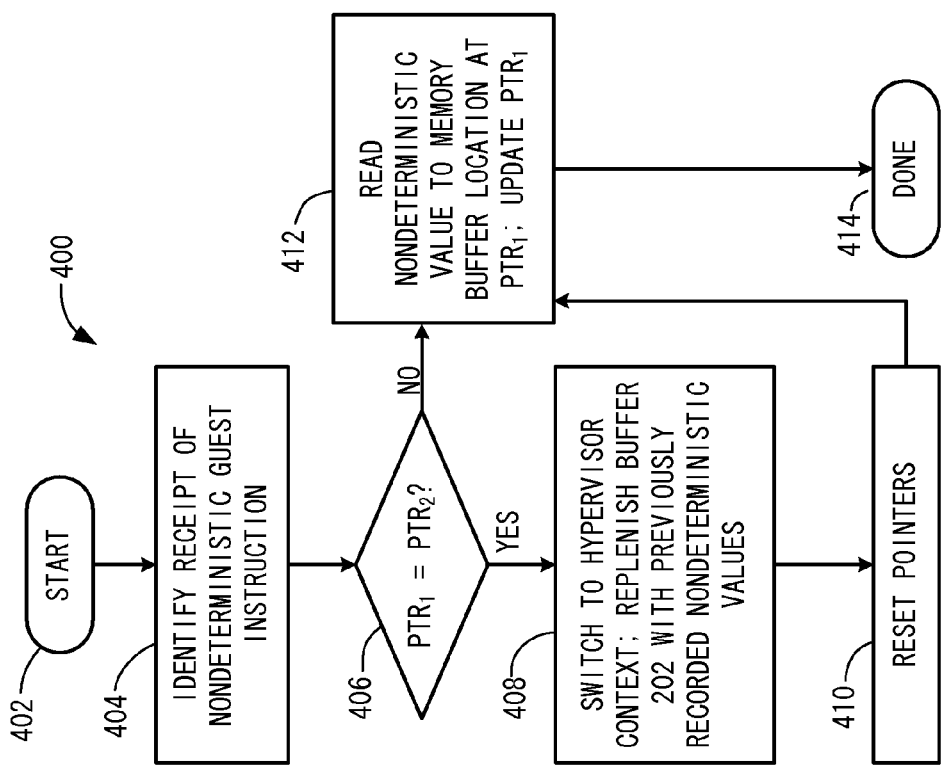
FIG. 5A is a flow chart illustrating a method in accordance with an embodiment of the present invention in replay mode.

FIGS. 5A and 5B show by way of example how pointers and non-deterministic values may be handled during replay mode. When entering the replay mode, hypervisor 132 may allocate a memory buffer 202 in machine memory 201 as shown in FIG. 5B and set PTR$_1$ to identify the location in memory buffer 202 of the next non-deterministic value (Entry 3) to be provided to the replay and set PTR$_2$ to identify the location of the end of memory buffer 202. FIG. 5A shows a flowchart 400 illustrating by way of example a procedure CPU 114 may perform when replaying a non-deterministic guest instruction.

The procedure begins as indicated by start block 402 and proceeds to operation 404 wherein receipt of a non-deterministic guest instruction is identified. As mentioned above, non-deterministic guest instructions may be identified by being a member of a predefined set of non-deterministic guest instructions that forms a subset of the instructions CPU 114 is capable of executing. Once the non-deterministic guest instruction is identified in operation 404, the procedure flows to operation 406 wherein CPU 114 determines if $PTR_1$ is equal to $PTR_2$. When $PTR_1$ is equal to $PTR_2$, then memory buffer 202 is empty and the procedure flows to operation 408 wherein the system switches contexts for hypervisor execution. The hypervisor then replenishes buffer 202 with non-deterministic values from log 140. Then, in operation 410, the hypervisor resets the pointers, and returns to the VM's context which proceeds with operation 412, described below.

Returning to operation 406, when $PTR_1$ is not equal to $PTR_2$, the procedure flows to operation 412, wherein the next non-deterministic value is retrieved from the location identified by $PTR_1$ in buffer 202, e.g., entry 3. Thus, the non-deterministic instruction need not be executed in replay mode since the result is simply retrieved from buffer 202. After retrieving the next non-deterministic instruction, $PTR_1$ may be updated, e.g., incremented as shown in FIG. 5B to the next available memory buffer 202 location.

It should be recognized that the Figures are presented for illustration only and an actual implementation may have a much larger buffer. Buffer 202 may be any arbitrary size depending on the implementation. For example, a larger buffer will be more efficient by reducing the frequency of context switches, but will require more memory to implement, or, in the case the buffer is implemented in the CPU, more logic gates and hence, processor real estate.

In one embodiment, buffer 202 may be at least partially emptied during record mode and at least partly replenished during record mode in an opportunistic manner. Other events besides the execution of a non-deterministic instruction can cause an exit to hypervisor 132. For example, hypervisor 132 is generally configured to intercept all or most host interrupts. All such interrupts result in exits to hypervisor 132 including a number of periodic interrupts from the host timer hardware. Similarly, many privileged instructions may be intercepted by hypervisor 132 in the normal course of virtualization: IN/OUT instructions driving hardware devices, CPU Control Register accesses, etc. A VM 120 executing such instructions will generate additional exits to hypervisor 132. Upon such an exit to hypervisor 132 during record mode, at least some of the contents of the memory buffer 202 can be stored by hypervisor 132 to log 140, even if memory buffer 202 is not full Likewise, upon such an exit to hypervisor 132 during replay mode, hypervisor 132 may populate empty locations in the memory buffer 202 by additional output values from the log 140. This technique can advantageously reduce the number of expensive hypervisor exits caused by full and empty memory buffers 202.

In another embodiment of the present invention, CPU 114 may support the record and replay execution modes wherein memory buffer 202 resides in guest virtual memory instead of machine memory (or hardware registers). For example, in certain CPUs, the microcode that implements RDTSC (and other non-deterministic instructions) might be both simpler and faster when the instruction produces and consumes values from the virtual rather than machine memory. The memory buffer in virtual memory can thus be populated and consumed at hardware speeds without additional exits or to traps to hypervisor 132. However, since the memory buffer resides in guest virtual memory, the memory buffer can be managed (allocated, etc.) by the guest driver 126, the guest operating system 124, etc. For example, memory buffer 202 may be established in virtual memory by VM 120. Such memory may be protected from being altered by guest operating system 124 or guest application 128 while it is being used (during record and replay). For example, hypervisor 132 may unmap pages of memory corresponding to buffer 202 between replenishing points in order to protect memory buffer 202 from accidental changes by the guest operating system 124 or applications 128. Alternatively, if guest operating system 124 is trusted, memory pages used by memory buffer 202 could be mapped as OS-only, thereby disabling access to the memory buffer 202 by applications 128. Guest operating system 124 and/or guest driver 126 may be configured to manage the memory by flexibly allocating different amounts of memory to the memory buffer. This can make at least part of the memory buffer space available to store additional outputs. In such an embodiment, the additional virtual memory may also be protected from being altered by guest operating system 124 or guest application 128 while it is being used.

Other approaches are envisioned wherein more than one memory buffer may be used to handle non-deterministic instructions. For example, certain instructions may be handled using a memory buffer in virtual memory, others may be handled using a memory buffer in machine memory, while yet others may be handled using hardware registers.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as or include one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) —CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A CPU having operational modes comprising at least a normal mode, a record mode, and a replay mode, wherein:
the CPU is configured such that when the CPU is in the record mode, each time an instruction included in a predefined subset of an instruction set of the CPU is executed in a virtual computing instance, a result of execution of the instruction is stored in a buffer without a context switch to a virtualization software hosting the virtual computing instance, the CPU triggering a fault or exception to perform the context switch and move contents of the buffer into a log file that is accessible by the virtualization software when the buffer is full; and
the CPU is further configured such that when the CPU is in the replay mode, each time the instruction included in the predefined subset is executed, a next non-deterministic value is read from the buffer without a context switch to the virtualization software and supplied in place of a result of the execution of the instruction, the CPU triggering a fault or exception to perform the context switch to the virtualization software and move contents of the log file into the buffer, when the buffer does not contain the next non-deterministic value;
wherein the predefined subset comprises instructions that generate non-deterministic values.

2. The CPU of claim 1, wherein the operational mode of the CPU depends on a value of at least two data bits residing in at least one machine specific register.

3. The CPU of claim 1, wherein the operational mode of the CPU depends on a value of at least two data bits within a data structure, the data bits being accessible by a privileged process.

4. The CPU of claim 3, wherein the data bits are located in machine memory, the machine memory being accessible by the CPU via a data bus.

5. The CPU of claim 3, wherein the virtual computing instance is a guest virtual machine and the data bits define a mode of the guest virtual machine from which the instruction originates.

6. The CPU of claim 1, wherein the operational mode of the CPU is changed by issuing a machine-specific instruction to the CPU.

7. The CPU of claim 1, wherein the buffer resides on the CPU.

8. The CPU of claim 1, wherein the buffer resides in machine memory in communication with the CPU over a data bus.

9. The CPU of claim 8, wherein the virtual computing instance is a guest virtual machine and the machine memory is addressed by virtual addresses within a virtual address space of the guest virtual machine from which the instruction originates.

* * * * *